United States Patent [19]

Moynat

[11] Patent Number: 5,819,841
[45] Date of Patent: Oct. 13, 1998

[54] FASTENING DEVICE FOR A HEAT EXCHANGER FOR A MOTOR VEHICLE HEATING AND/OR AIR CONDITIONING INSTALLATION

[75] Inventor: Pascale Moynat, Elancourt, France

[73] Assignee: Valeo Climatisation, La Verriere, France

[21] Appl. No.: 768,786

[22] Filed: Dec. 17, 1996

[30] Foreign Application Priority Data

Dec. 19, 1995 [FR] France .................................. 95 15075

[51] Int. Cl.⁶ ........................................................ F28F 9/00
[52] U.S. Cl. ................................................. 165/78; 165/76
[58] Field of Search .................... 165/67, 76, 78

[56] References Cited

U.S. PATENT DOCUMENTS

| 4,328,859 | 5/1982 | Bouvot ...................................... 165/78 |
| 4,987,639 | 1/1991 | Baiuley et al. ........................... 16/126 |

FOREIGN PATENT DOCUMENTS

| 2 444 580 | 7/1980 | France . |
| 2 169 627 | 7/1986 | United Kingdom . |

OTHER PUBLICATIONS

French Search Report dated 20 Sep. 1996.

*Primary Examiner*—Allen J. Flanigan
*Attorney, Agent, or Firm*—Morgan & Finnegan, LLP

[57] ABSTRACT

A heat exchanger is introduced into a casing in the manner of a drawer, and is retained in a seating within the casing by a fastening device which consists of a pair of matching fastening elements, namely a lug fixed to a header of the heat exchanger, and a further lug which is fixed to the casing. The lugs have holes, which, when the heat exchanger is introduced fully into the casing, are aligned with each other in a direction substantially at right angles to the direction in which the heat exchanger is introduced into the casing. The fastening device is secured by a cotter pin which is passed through all of these holes. The invention is especially useful in heat exchangers for motor vehicles.

9 Claims, 1 Drawing Sheet

FASTENING DEVICE FOR A HEAT EXCHANGER FOR A MOTOR VEHICLE HEATING AND/OR AIR CONDITIONING INSTALLATION

FIELD OF THE INVENTION

This invention relates to devices for fastening a heat exchanger in a casing, the heat exchanger and casing constituting together a heat exchange unit forming part of an installation for heating and/or air conditioning the cabin of a motor vehicle and the like.

BACKGROUND OF THE INVENTION

In known arrangements of this type, the casing defines a seating which is provided with an aperture through which the heat exchanger is introduced. Thus, the heat exchanger, which comprises a tube bundle and at least one fluid header, is introduced into the casing by sliding it into position in the manner of a drawer. In addition, the casing also has an air duct passing through the seating in which the heat exchanger is accommodated, so that the air flowing through this duct passes through the tube bundle of the heat exchanger and can be heated or cooled.

It is usual to secure the heat exchanger in position in its seating in the casing by screw fastening, using fastening lugs which project from one of the headers of the heat exchanger. These lugs are formed with holes through which fastening screws or the like are passed. The operation of securing the heat exchanger by screw fastening in this way is a lengthy one and is somewhat tiresome.

It has also been proposed, in French patent No. 78 36166, to secure the heat exchanger in its seating by clipping, using lugs which project from one header of the heat exchanger. However, these lugs are fragile, and are very much exposed until such time as the heat exchanger has been fitted in place in the casing.

In another known arrangement, disclosed in French patent No. 81 11654, the casing includes elastically deformable lugs which are arranged to cooperate, in clipping relationship, with an end portion of the heat exchanger. This arrangement does however complicate the design of the casing.

A further disadvantage of the above mentioned known arrangements is that they still do not enable the heat exchanger to be removed quickly, for purposes of repair or recycling at the end of the useful life of the heat exchanger.

DISCUSSION OF THE INVENTION

A main object of the invention is to overcome the above mentioned drawbacks, by simplifying and making easier the operation of fastening the heat exchanger within its seating in the casing.

Another object of the invention is to propose a fastening device which facilitates removal of the heat exchanger, especially with a view to recycling the latter at the end of its useful life.

According to the invention, a fastening device, for fastening a heat exchanger in position in a casing which defines a seating having an aperture for the introduction of the heat exchanger through the aperture in the manner of a drawer, is characterised in that the fastening device comprises at least one pair of matching fastening elements, one of which is fixed to a fluid header of the heat exchanger, the other one being fixed to the casing, The fastening elements are provided with respective holes which, when the heat exchanger is introduced fully into the seating, are aligned with each other in a direction which is substantially at right angles to the direction in which the heat exchanger is introduced into the casing. In this way a cotter pin to be fitted through the aligned holes, whereby to retain the heat exchanger in position in the seating.

Thus, securing of the heat exchanger in position is carried out in a very simple way by fitting a cotter pin or the like through the respective holes in the fastening elements. The cotter pin can only be introduced if these holes are aligned with each other, that is to say when the heat exchanger is fully introduced into the seating.

A further advantage of the invention is that the heat exchanger can be removed very simply for purposes of repair or recycling, by removal of the cotter pin.

In a preferred embodiment of the invention, at least one of the fastening elements is a lug which extends in a direction substantially parallel to the direction in which the heat exchanger is introduced.

Preferably, one of the lugs is a simple lug, while the other lug is a double lug comprising two lugs parallel to each other, which define between them a gap for receiving the simple lug.

Preferably, the simple lug is fixed to the header, and the double lug is fixed to the casing.

Preferably, the fastening element which is fixed to the header is formed on an edge, preferably a longitudinal edge, of a support plate which is adapted to be fixed to the header.

In a preferred embodiment of the invention, the support plate is made integrally with a top wall of the header.

In another version, the support plate is made in the form of an independent cover member adapted to engage against a top wall of the header.

According to another preferred feature of the invention, the support plate is adapted to rest in engagement against a peripheral flange, which projects outwardly from the casing and which surrounds the aperture of the seating. The attachment element which is fixed to the casing is situated on the opposite side of the peripheral flange from the aperture.

Preferably, the peripheral flange is fixed to a lateral wall of the casing, the aperture of the seating being formed in the lateral wall. The attachment element which is fixed to the casing is formed at the junction between the lateral wall and the peripheral flange.

Further features and advantages of the invention will appear more clearly on a reading of the following detailed description of a preferred embodiment of the invention, which is given by way of example only and with reference to the accompanying drawings.

DESCRIPTION OF A PREFERRED EMBODIMENT OF THE INVENTION

Figure 1:
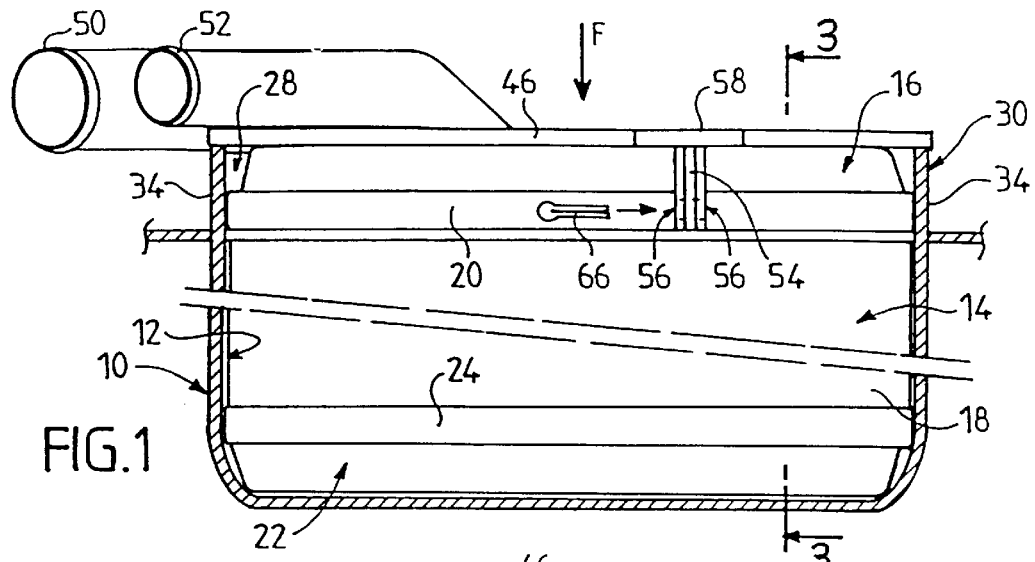
FIG. 1 is a view in transverse cross section showing part of a heat exchanger unit for a heating and/or air conditioning unit for the cabin of a motor vehicle, the unit having a casing within which a heat exchanger is fixed by means of a fastening device in accordance with the invention.

Reference is first made to FIG. 1, which shows part of a casing 10 of an installation for the heating and/or air conditioning of the cabin of a motor vehicle. The casing 10 is made in moulded plastics material, and defines a seating 12 (see FIGS. 1 and 3), which is adapted to receive a heat exchanger 14. This heat exchanger 14 is introduced in the manner of a drawer in the direction indicated by the arrow F.

Figures 3, 4:
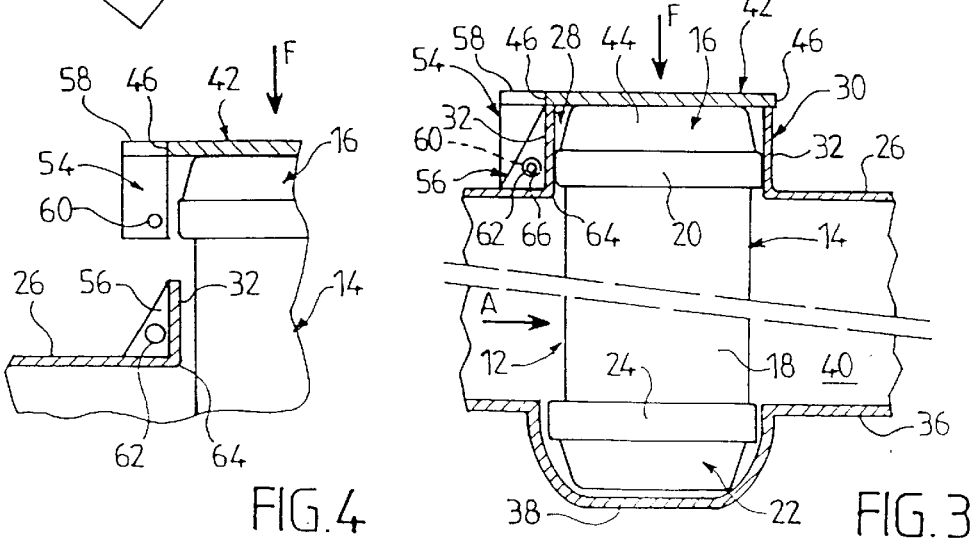
FIG. 3 is a view in partial cross section taken on the line III—III in FIG. 1.
FIG. 4 is a partial view in cross section, similar to that in FIG. 3, but prior to the full introduction of the heat exchanger into the casing.

The heat exchanger 14, as shown in FIGS. 1 and 3, comprises a first or upper fluid header 16 which is joined to a tube bundle 18 through a header plate 20, together with a lower or second fluid header 22 which is joined to the same tube bundle 18 through an interposed header plate 24. The tube bundle 18 consists of a multiplicity of heat transfer tubes with cooling fins (not shown).

The casing 10 has a top or lateral wall 26, which in this example is a top wall, in which an aperture 28, seen in FIGS. 1 and 3, is formed. The aperture 28 is generally rectangular in form, and the heat exchanger 14 is introduced through this aperture into the seating 12. The aperture 28 is surrounded by a peripheral flange 30, FIGS. 1 and 3, which is joined, at right angles, to the top wall 26 of the casing, on the outer side of the latter. The flange 30 is formed integrally by moulding with the top wall 26, and comprises two longitudinal portions 32 which are parallel to each other as can be seen in FIG. 3, together with two transverse portions 34 which are parallel with each other as can be seen in FIG. 1.

The casing 10 also includes an opposite side wall 36, FIGS. 1 and 3, which in this example is a bottom wall. The bottom wall 36 includes a base portion 38 in which the lower header 22 of the heat exchanger is accommodated. The top wall 26 and bottom wall 36 together define between them a duct 40, through which a stream of air A is passed, so as to pass through the tube bundle 18 of the heat exchanger as can be seen in FIG. 3.

The heat exchanger 14 includes a generally rectangular support plate 42 which, in the example shown, is formed integrally with the upper header 16 of the heat exchanger, being joined to a top wall 44 of the latter. The support plate 42 is bounded by two opposed longitudinal edges 46 and two opposed transverse edges 48, see FIG. 2. In addition, it supports two tubular connections 50 and 52 for the inlet and outlet of a heat transfer fluid which is to flow through the interior of the heat exchanger 14. The support plate 42 is arranged to lie in engagement against the flange 30 when the heat exchanger 14 is fully introduced into the seating 12.

In order to immobilize the heat exchanger in position in the seating 12, a fastening device, comprising a pair of matching attachment elements, is provided. These attachment elements consist of a fastening lug 54 which is fixed to the header 16, and a fastening lug 56 which is fixed to the casing 10.

The lug 54 is a simple lug of generally rectangular form as can be seen in FIG. 4, and extends parallel to the direction in which the heat exchanger is introduced into the casing. The lug 54 lies in a plane which is generally at right angles to the longitudinal edges 46 of the support plate 42 (see FIG. 4). The lug 54 is formed integrally with the header 16. It is attached to the support plate 42 through a generally triangular web portion 58 which lies in the same plane as the support plate 42, and which projects from one of the longitudinal edges 46. The simple lug 54 is formed with a through hole 60, the axis of which is parallel to the longitudinal edges 46 of the support plate 42.

The fastening element 56 is in the form of a double lug, best seen in FIG. 1 and comprising two generally triangular lugs (see FIGS. 3 and 4), which are situated at the junction of the top wall 26 of the casing and one of the longitudinal portions 32 of the flange 30. The two lugs 56 are parallel to each other and extend in the direction, indicated by the arrow F, in which the heat exchanger is introduced. Between the two lugs 56 there is a gap, the width of which is slightly greater than the thickness of the lug 54. In addition, each of the lugs 56 has a through hole 62, these two holes being aligned with each other in a direction parallel to that of the edge 64 by which the longitudinal portion 32 of the flange 30 is joined to the top wall 26 of the casing 10.

The heat exchanger 14 is secured in position in the casing 10 as follows. The heat exchanger is first introduced into its seating 10 in the direction of the arrow F, FIG. 4. During this movement, the fastening lug 54 approaches the double fastening lug 56, and at the end of the course of travel, it is inserted into the gap between the two lugs 56. Once so introduced, the heat exchanger is correctly positioned in the seating 12. It is then sufficient to insert a cotter pin 66 through the two holes 62 and the hole 60, which are now aligned in a direction generally at right angles to the direction of introduction of the heat exchanger. This cotter pin may be a simple pin, a split pin as shown, or the like. The heat exchanger is now fully immobilised within its seating 12, with the support plate 42 lying against the flange 30.

Figure 2:
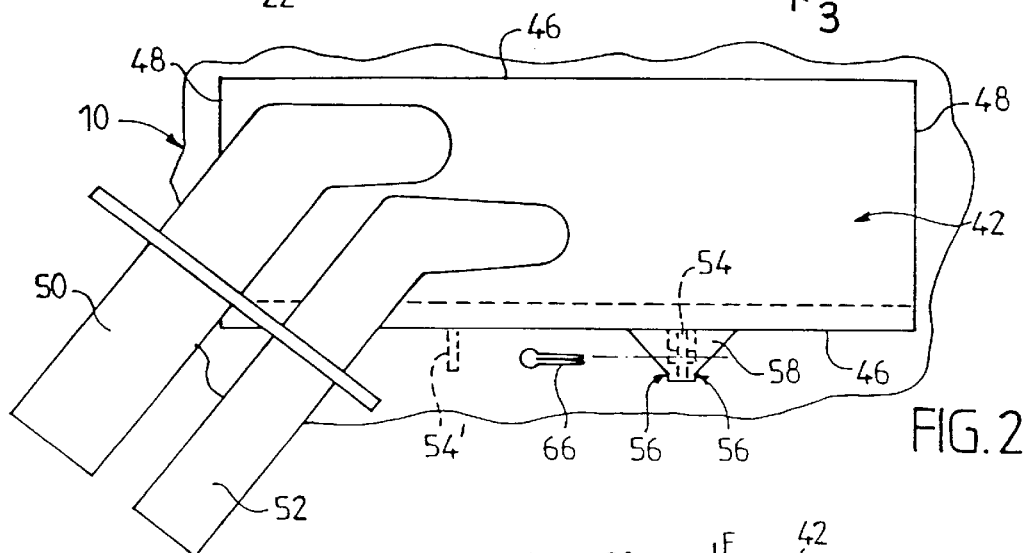
FIG. 2 is a top plan view corresponding to FIG. 1.

In a modified embodiment, it would be possible to join the simple fastening lug to the top wall 26, as is indicated in broken lines with the reference numeral 54' in FIG. 2. In that case, the double lug would depend from the support plate 42.

Generally, a single pair of attachment elements is sufficient to ensure that the heat exchanger is secured in position. However, it is possible to provide another pair of fastening elements, preferably on the other side of the aperture 28.

In a further modified embodiment, not shown, the support plate 42 could be made in the form of an independent cover plate adapted to engage on the top wall 44 of the header 16 and on the flange 30. In that case, it is preferable to provide two pairs of fastening elements, on either side of the aperture.

The invention is of course not limited to the embodiments described above, especially as regards the structure of the fastening elements such as the lugs 54 and 56.

The invention is most particularly applicable to the fastening of a heat exchanger such as a heating radiator or evaporator in an air conditioning apparatus for a motor vehicle cabin.

What is claimed is:

1. A heat exchanger unit having a hollow casing defining a seating and an aperture for said seating; a heat exchanger in the casing, the aperture defining a direction of introduction of the heat exchanger into the casing through the aperture to fully seat the heat exchanger therein; and a fastening device securing the fully seated heat exchanger in position therein, the heat exchanger having at least one fluid header, wherein the fastening device comprises at least one pair of matching fastening elements, said pair of fastening elements having a first fastening element fixed to the header, a second fastening element fixed to the casing, each said fastening element having a respective through hole formed in a direction substantially at right angles to the direction of introduction of the heat exchanger, with the fully seated heat exchanger the holes in said fastening elements are aligned with each other in said direction substantially at right angles to the direction of introduction, and a cotter pin received within said aligned holes to immobilize the heat exchanger.

2. A unit according to claim 1, wherein at least one of said fastening elements is a lug extending in a direction substantially parallel to the direction of introduction.

3. A unit according to claim 2, wherein one of said first and second fastening elements is a simple lug, the other of said fastening elements being a double lug having two parallel lugs, said double lugs defining a gap therebetween for receiving said simple lug.

4. A unit according to claim 3, wherein said simple lug is fixed to the header, and said double lug is fixed to the casing.

5. A unit according to claim 1, further including a support plate fixed to the header and defining an edge of the support plate, said first fastening element being on said edge.

6. A unit according to claim 5, wherein the header has a lateral wall, and said support plate is integral with said lateral wall.

7. A unit according to claim 5, wherein the header has a lateral wall, the support plate being a separate cover member engaging against said lateral wall.

8. A unit according to claim 5, wherein the casing includes a peripheral flange extending outwardly from the casing and surrounding the aperture for the seating, said support plate being in abutment against said flange, and the second fastening element being situated on the opposite side of said flange from the aperture.

9. A unit according to claim 8, wherein the casing has a lateral wall through which the aperture of the seating is formed, said lateral wall being joined to the peripheral flange, and said second fastening element being formed at the junction of said lateral wall with said peripheral flange.

* * * * *